(12) United States Patent
Hinokuma et al.

(10) Patent No.: US 10,478,805 B2
(45) Date of Patent: Nov. 19, 2019

(54) METHOD FOR PRODUCING AMMONIA COMBUSTION CATALYST AND METHOD FOR UTILIZING HEAT GENERATED BY AMMONIA CATALYST COMBUSTION

(71) Applicant: National University Corporation Kumamoto University, Kumamoto (JP)

(72) Inventors: Satoshi Hinokuma, Kumamoto (JP); Masato Machida, Kumamoto (JP)

(73) Assignee: National University Corporation Kumamoto University, Kumamoto (JP)

( * ) Notice: Subject to any disclaimer, the term of this patent is extended or adjusted under 35 U.S.C. 154(b) by 0 days.

(21) Appl. No.: 15/749,954

(22) PCT Filed: Aug. 4, 2016

(86) PCT No.: PCT/JP2016/072956
§ 371 (c)(1),
(2) Date: Feb. 2, 2018

(87) PCT Pub. No.: WO2017/022828
PCT Pub. Date: Feb. 9, 2017

(65) Prior Publication Data
US 2018/0221858 A1 Aug. 9, 2018

(30) Foreign Application Priority Data
Aug. 6, 2015 (JP) .................. 2015-156425

(51) Int. Cl.
*C01B 3/04* (2006.01)
*B01J 21/04* (2006.01)
(Continued)

(52) U.S. Cl.
CPC .............. *B01J 23/72* (2013.01); *B01J 21/04* (2013.01); *B01J 23/50* (2013.01); *C01B 3/04* (2013.01);
(Continued)

(58) Field of Classification Search
CPC ... B01J 21/04; B01J 23/42; B01J 23/44; B01J 23/464; B01J 23/468; B01J 23/50;
(Continued)

(56) References Cited

U.S. PATENT DOCUMENTS 3,224,981 A * 12/1965 Hirschler, Jr. ....... B01D 53/944
502/245
3,226,340 A * 12/1965 Hirschler, Jr. ......... B01D 53/86
502/244
(Continued)

FOREIGN PATENT DOCUMENTS

JP 46023052 B 7/1971
JP 61243032 A 10/1986
(Continued)

OTHER PUBLICATIONS

Foreign Communication from a related application—International Search Report and Written Opinion of PCT/JP2016/072956, with English translation of Search Report, dated Oct. 18, 2016, 8 pages.
(Continued)

*Primary Examiner* — Cam N. Nguyen
(74) *Attorney, Agent, or Firm* — Conley Rose, P.C.; Keith C. Rawlins

(57) ABSTRACT

Provided are a supported catalyst including: a support body which is formed by a catalyst composition being supported by a carrier, in which the catalyst composition contains an oxide of copper, and the carrier contains $\alpha Al_2O_3 \cdot \beta B_2O_3$ ($\alpha$ and $\beta$ each represent a positive number); and a hydrogen production method for producing hydrogen from ammonia, including: an ammonia combustion step of reacting ammonia with oxygen in the presence of the supported catalyst; and an ammonia decomposition step of decomposing the
(Continued)

ammonia into hydrogen and nitrogen by utilizing heat generated by the reaction between the ammonia and the oxygen.

3 Claims, 8 Drawing Sheets

(51) Int. Cl.
    *B01J 23/42* (2006.01)
    *B01J 23/44* (2006.01)
    *B01J 23/50* (2006.01)
    *B01J 23/52* (2006.01)
    *B01J 23/72* (2006.01)
    *B01J 23/89* (2006.01)
    *B01J 23/46* (2006.01)

(52) U.S. Cl.
    CPC .............. *C01B 3/047* (2013.01); *B01J 23/42* (2013.01); *B01J 23/44* (2013.01); *B01J 23/462* (2013.01); *B01J 23/464* (2013.01); *B01J 23/468* (2013.01); *B01J 23/52* (2013.01); *B01J 2523/305* (2013.01); *B01J 2523/31* (2013.01); *Y02E 60/364* (2013.01)

(58) Field of Classification Search
    CPC ........ B01J 23/52; B01J 23/72; B01J 23/8926; C01B 3/04; C01B 3/047
    See application file for complete search history.

(56) References Cited

U.S. PATENT DOCUMENTS

| | | | | |
|---|---|---|---|---|
| 3,271,324 A | * | 9/1966 | Hirschler, Jr. | ....... B01D 53/944 |
| | | | | 423/213.5 |
| 3,374,183 A | * | 3/1968 | Cooper | .................... B01J 23/72 |
| | | | | 423/213.2 |
| 3,447,893 A | * | 6/1969 | Hirschler, Jr. | ....... B01D 53/944 |
| | | | | 423/213.2 |
| 3,856,702 A | | 12/1974 | McArthur | |
| 4,590,324 A | | 5/1986 | Satek | |

FOREIGN PATENT DOCUMENTS

| | | |
|---|---|---|
| JP | S61242913 A | 10/1986 |
| JP | 07256099 A | 10/1995 |
| JP | 2000140640 A | 5/2000 |
| JP | 2010240645 A | 10/2010 |
| JP | 2013075286 A | 4/2013 |
| JP | 2015-156425 | 8/2015 |
| WO | 2014175349 A1 | 10/2014 |
| WO | 2015064385 A1 | 5/2015 |
| WO | 2017022828 A1 | 2/2017 |
| WO | 2017022828 A1 | 9/2017 |

OTHER PUBLICATIONS

Foreign Communication from a related application—International Preliminary Report on Patentability of PCT/JP2016/072956, dated Jun. 6, 2017, with English translation, 9 pages.

* cited by examiner

METHOD FOR PRODUCING AMMONIA COMBUSTION CATALYST AND METHOD FOR UTILIZING HEAT GENERATED BY AMMONIA CATALYST COMBUSTION

CROSS REFERENCE TO RELATED APPLICATIONS

This application is a filing under 35 U.S.C. 371 of International Application No. PCT/JP2016/072956 filed Aug. 4, 2016, entitled "Method for Producing Ammonia Combustion Catalyst and Method for Utilizing Heat Generated by Ammonia Catalyst Combustion" which claims priority to Japanese Patent Application No. 2015-156425 filed Aug. 6, 2015, which applications are incorporated by reference herein in their entirety.

TECHNICAL FIELD

The present invention relates to a supported catalyst, a production method therefor, an ammonia combustion method, and a hydrogen production method.

BACKGROUND ART

Currently, the transition to a renewable energy society is an important issue that is common to developed countries. In response to this issue, there has been a demand for construction for a technology base using hydrogen ($H_2$) as an energy source.

Hydrogen is considered as a first candidate for clean secondary energy. However, since hydrogen itself is difficult to liquefy, a liquid carrier from which hydrogen can be generated and which is easy to store and transport has been desired.

Among the examples, from the viewpoint that the hydrogen density is high and liquefaction is easily carried out (liquefaction conditions: less than 1 MPa, room temperature), ammonia ($NH_3$) is considered as a promising liquid carrier.

Since $NH_3$ is free from carbon, $NH_3$ has been attracting attention as an alternative fuel for petroleum or the like. From the viewpoint that the octane value is high and the compression ratio can be increased, $NH_3$ can be applied to a substantially compact and fuel-efficient combustor.

Hereinafter, a reaction formula related to $NH_3$ combustion (exothermic reaction) is shown.

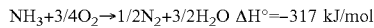

As shown in the formula above, $NH_3$ is a combustible gas and there is a possibility that $NH_3$ can be widely utilized in internal combustion and external combustion engines such as automobiles, aircrafts, thermal power plants, and iron works as an alternative fuel for gasoline or light oil. However, in $NH_3$ combustion, there is a problem in that nitrogen ($N_2$) is generated and the generation of nitrogen is accompanied by generation of $NO_x$.

In consideration of such problem, for example, PTL 1 suggests a catalyst for selective oxidative decomposition of ammonia in which an oxide of a first group metal and an oxide of a second group metal are supported by the surface of a ceramic catalyst carrier.

Further, PTL 2 suggests that an ammonia combustion catalyst contains at least one metal element selected from manganese-cerium oxides as catalyst A components and non-noble metal elements belonging to the groups 8 to 11 in the periodic table as catalyst B components.

CITATION LIST

Patent Literature

[PTL 1] Japanese Unexamined Patent Application, First Publication No. 2000-140640
[PTL 2] Japanese Unexamined Patent Application, First Publication No. 2010-240645

SUMMARY OF THE INVENTION

Technical Problem

Meanwhile, realization of zero emission is also desired at the time of transition to a renewable energy society.

In order to realize zero emission, it is necessary to further suppress generation of $NO_x$ and improve $N_2$ selectivity in $NH_3$ combustion using a catalyst of the related art which has been suggested in PLT 1, 2, or the like.

Further, $NH_3$ serving as a liquid carrier is decomposed into $H_2$ and $N_2$. Hereinafter, a reaction formula related to decomposition of $NH_3$ (endothermic reaction) is shown.

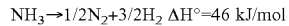

As shown in the formula above, the decomposition of $NH_3$ into $H_2$ and $N_2$ is an endothermic reaction. In other words, it is necessary to supply thermal energy required for decomposition of $NH_3$ from the outside in order to obtain $H_2$ from $NH_3$.

The present invention has been made in consideration of the above-described circumstances, and an object thereof is to provide a supported catalyst which exhibits high catalytic activity in ammonia combustion and excellent $N_2$ selectivity and in which generation of $NO_x$ is suppressed; an ammonia combustion method using the same; and a hydrogen production method for producing hydrogen from ammonia.

Solution to Problem

As the result of research conducted by the present inventors, it was found that generation of fuel $NO_x$ is significantly suppressed and $N_2$ selectivity can be increased while burning $NH_3$ serving as a fuel in a low temperature by employing a supported catalyst obtained by allowing an oxide of copper to be supported by a carrier formed of a specific material, thereby completing the present invention.

According to the present invention, there is provided a supported catalyst including a support body which is formed by a catalyst composition being supported by a carrier, in which the catalyst composition contains an oxide of copper, and the carrier contains $\alpha Al_2O_3 \cdot \beta B_2O_3$ ($\alpha$ and $\beta$ each represent a positive number).

It is preferable that the catalyst composition further contains a metal other than copper.

It is preferable that the metal other than copper is at least one selected from the group consisting of silver, gold, iridium, platinum, palladium, rhodium, and ruthenium.

Further, according to the present invention, there is provided an ammonia combustion method including: reacting ammonia with oxygen in the presence of the supported catalyst of the present invention.

Further, according to the present invention, there is provided a hydrogen production method for producing hydrogen from ammonia, including: an ammonia combustion step of reacting ammonia with oxygen in the presence of the supported catalyst of the present invention; and an ammonia decomposition step of decomposing the ammonia into hydrogen and nitrogen by utilizing heat generated by the reaction between the ammonia and the oxygen.

Advantageous Effects of Invention

According to the present invention, it is possible to provide a supported catalyst which exhibits high catalytic activity in ammonia combustion and excellent $N_2$ selectivity and in which generation of $NO_x$ is suppressed; an ammonia combustion method using the same; and a hydrogen production method for producing hydrogen from ammonia.

DETAILED DESCRIPTION

Supported Catalyst

Figure 1:
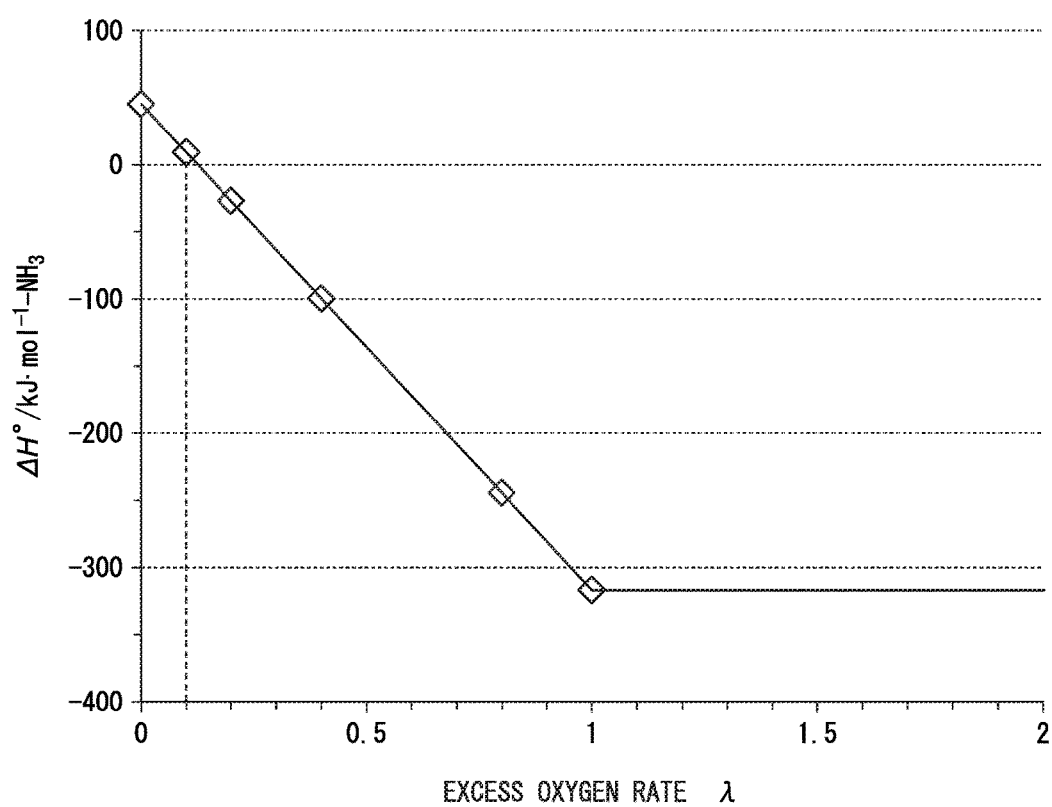
FIG. 1 is a graph showing enthalpy change ($\Delta H°$) with respect to an excess oxygen ratio $\lambda$ while ammonia is burned.

The supported catalyst of the present invention includes a support body formed by a catalyst composition being supported by a carrier.

Catalyst Composition

The catalyst composition of the present invention contains an oxide of copper.
Examples of the oxide of copper include CuO, $Cu_2O$, $CuAlO_2$, and $CuAl_2O_4$. From the viewpoint that catalytic activity increases at a lower temperature (low temperature activity), CuO is preferable. Further, particularly from the viewpoint of more easily suppressing generation of NO, $Cu_2O$ is preferable.

The oxide of copper contained in the catalyst composition may be used alone or in combination of two or more kinds thereof.

The content of the oxide of copper in the catalyst composition is 50% by mass or greater, preferably 70% by mass or greater, more preferably 80% by mass or greater, still more preferably 90% by mass or greater, and may be 100% by mass with respect to the total mass (100% by mass) of the catalyst composition.

It is preferable that the catalyst composition further contains a metal other than copper. In a case where the catalyst composition contains copper and a metal other than copper, the catalytic activity increases and particularly the generation of $NO_x$ is more likely to be suppressed.

As the metal other than copper, at least one selected from the group consisting of silver, gold, iridium, platinum, palladium, rhodium, and ruthenium is preferable. Among these, silver is particularly preferable.

The metal other than copper contained in the catalyst composition may be used alone or in combination of two or more kinds thereof.

In a case where the catalyst composition contains a metal other than copper, the content of the metal other than copper in the catalyst composition is preferably 20% by mass or less and more preferably in a range of 0.5% to 10% by mass with respect to the total mass (100% by mass) of the catalyst composition.

In a case where the catalyst composition contains copper and a metal other than copper, the ratio of copper to the metal other than copper is a mass ratio expressed by metal other than copper/copper (hereinafter, referred to as "metal other than copper/copper"), and the ratio of metal other than copper/copper is preferably in a range of 0.1 to 4 and more preferably in a range of 1 to 3.

In a case where the ratio of metal other than copper/copper is in the above-described preferable range, the catalytic activity increases and particularly the generation of $NO_x$ is more likely to be suppressed.

Preferred specific examples of the catalyst composition are as follows. The proportion of each component indicates the proportion thereof in the catalyst composition.

(c1) 100% by mass of CuO
(c2) 100% by mass of $Cu_2O$
(c3) Combination of 25% by mass of CuO and 75% by mass of Ag
(c4) Combination of 25% by mass of $Cu_2O$ and 75% by mass of Ag Carrier The carrier of the present invention contains $\alpha Al_2O_3 \cdot \beta B_2O_3$ ($\alpha$ and $\beta$ each represent a positive number). In a case where a carrier containing $\alpha Al_2O_3 \cdot \beta B_2O_3$ is employed, both of low temperature activity and $N_2$ selectivity increase.

$\alpha$ represents a positive number and is preferably in a range of 2 to 20, more preferably in a range of 2 to 10, and particularly preferably 10.

$\beta$ represents a positive number and is preferably in a range of 1 to 5, more preferably 1 or 2, and particularly preferably 2.

$\alpha Al_2O_3 \cdot \beta B_2O_3$ contained in the carrier may be used alone or in combination of two or more kinds thereof.

The proportion of $\alpha Al_2O_3 \cdot \beta B_2O_3$ in the carrier is 50% by mass or greater, preferably 70% by mass or greater, more preferably 80% by mass or greater, still more preferably 90% by mass or greater, and may be 100% by mass with respect to the total mass (100% by mass) of the carrier.

Among examples of the carrier, a carrier containing $10Al_2O_3 \cdot 2B_2O_3$ is more preferable and a carrier formed of only $10Al_2O_3 \cdot 2B_2O_3$ is most preferable.

The carrier may contain components other than $\alpha Al_2O_3 \cdot \beta B_2O_3$ (optional components). Examples of the optional components include zeolite (NaY type), $Al_2O_3$, $SiO_2$, $TiO_2$ (anatase type), $ZrO_2$, and $CeO_2$.

The optional components contained in the carrier may be alone or in combination of two or more kinds thereof.

In a case where the carrier contains the optional components, the content of the optional components in the carrier is preferably 50% by mass or less and more preferably greater than 0% by mass and 20% by mass or less with respect to the total mass (100% by mass) of the carrier.

Preferred specific examples of the carrier are as follows.
(s1) 100% by mass of $10Al_2O_3 \cdot 2B_2O_3$
(s2) 100% by mass of $2Al_2O_3 \cdot B_2O_3$
(s3) Combination of 94% by mass of $10Al_2O_3 \cdot 2B_2O_3$ and 6% by mass of CuO
(s4) Combination of 84% by mass of $10Al_2O_3 \cdot 2B_2O_3$, 6% by mass of CuO, and 10% by mass of Ag.

The proportion of the catalyst composition in the supported catalyst is preferably in a range of 1% to 24% by mass and more preferably in a range of 2% to 12% by mass with respect to the total mass (100% by mass) of the supported catalyst.

In a case where the proportion of the catalyst composition is greater than or equal to the above-described preferable lower limit, the effects of suppressing generation of $NO_x$ and improving $N_2$ selectivity are likely to be sufficiently obtained. Further, even in a case where the proportion thereof is greater than the above-described preferable upper limit, the effects tend to be fully obtained.

Method for Producing Supported Catalyst

The supported catalyst of the present invention can be produced according to a conventionally known production method of allowing a carrier to support a catalyst composition. Examples of such a method of producing a supported catalyst include a wet impregnation method, an ion exchange method, a solid phase method, a coprecipitation method, a reverse coprecipitation method, a sol-gel method, an alkoxide method, a chemical vapor deposition method. Among these, from the viewpoint of excellent low temperature activity and $N_2$ selectivity, a wet impregnation method is preferable.

For example, in a case where a supported catalyst is produced according to a wet impregnation method, a carrier is impregnated with a liquid raw material that supplies a predetermined amount of catalyst composition. For example, in a case where the catalyst composition is CuO, $Cu(NO_3)_2$ is used as the liquid raw material and the carrier is impregnated with $Cu(NO_3)_2$. A target supported catalyst is obtained by baking the carrier preferably in a temperature range of 300° C. to 700° C. for 1 to 10 hours after such impregnation.

It is possible to confirm whether the catalyst composition is supported by the carrier using an X-ray diffraction (XRD) method, a fluorescent X-ray elemental analysis (XRF) method, an X-ray photoelectron spectroscopy (XPS) method, an X-ray absorption fine structure (XAFS) method, a visible ultraviolet spectroscopy (UV-vis) method, a raman spectroscopy method, or a method using a transmission electron microscope (TEM-EDX).

Examples of the shape of the supported catalyst of the present invention include a pellet form, a granular form, and a honeycomb form.

The specific surface area of the supported catalyst of the present invention is in a range of 40 to 200 $m^2 \cdot g^{-1}$ and preferably in a range of 50 to 100 $m^2 \cdot g^{-1}$. The specific surface area of the supported catalyst is measured using a $N_2$ adsorption (BET) method.

A combustion activity ($T_{10}$) at the time of burning ammonia in the presence of such a supported catalyst is in a range of 100° C. to 400° C.

The combustion activity ($T_{10}$) here indicates a reaction temperature at which the ammonia conversion ratio reaches 10%. The ratio of the ammonia combustion condition to the excess oxygen ratio $\lambda$ is 2.

The excess oxygen ratio $\lambda$ means {air-fuel ratio of actual air-fuel mixture (air-fuel mixture of ammonia and oxygen)}/{theoretical air-fuel ratio}.

The $N_2$ selectivity at the time of burning ammonia in the presence of such a supported catalyst is 85% or greater and preferably 90% or greater.

The NO selectivity at the time of burning ammonia in the presence of such a supported catalyst is 15% or less, preferably 10% or less, and more preferably 6% or less.

The $N_2O$ selectivity at the time of burning ammonia in the presence of such a supported catalyst is 5% or greater, preferably 2% or greater, and more preferably less than 1%.

Here, the $N_2$ selectivity, the NO selectivity, and the $N_2O$ selectivity each indicate a product selectivity at a temperature of 600° C. at which ammonia combustion is almost completed.

As described above, the supported catalyst of the present invention includes a support body formed by the catalyst composition containing an oxide of copper being supported by a carrier containing $\alpha Al_2O_3 \cdot \beta B_2O_3$.

By using the supported catalyst of the present invention, generation of $NO_x$ is further suppressed and high $N_2$ selectivity is exhibited in ammonia combustion particularly under a condition of a low excess oxygen ratio, compared to a supported catalyst which has been typically used (for example, a support body in which Pt is supported by $Al_2O_3$). As described above, the supported catalyst of the present invention is useful as an ammonia combustion catalyst.

According to the supported catalyst of the present invention, it is possible to decrease the starting temperature of ammonia combustion.

Further, the supported catalyst of the present invention has excellent heat resistance and water resistance.

In addition, such a supported catalyst can be prepared at a low cost because it is not necessary to use noble metals. Further, such a supported catalyst can be easily prepared using a general-purpose wet impregnation method as a catalyst preparation method.

Ammonia Combustion Method

An ammonia combustion method of the present invention is a method of reacting ammonia with oxygen in the presence of the above-described supported catalyst of the present invention.

Such an ammonia combustion method is carried out by circulating supply gas containing ammonia and oxygen through a reactor filled with the supported catalyst of the present invention such that the supply gas is brought into contact with the supported catalyst.

The amount of the supported catalyst to be used is preferably in a range of 1 mg to 1 g and more preferably in a range of 10 to 100 mg with respect to supply gas containing 1.0% of ammonia at a flow rate of 100 mL·min$^{-1}$.

FIG. 1 is a graph showing enthalpy change ($\Delta H°$) with respect to an excess oxygen ratio $\lambda$ while ammonia is burned.

In $NH_3$ combustion, in a case where the excess oxygen ratio $\lambda$ is approximately 0.1 or greater, the enthalpy change ($\Delta H°$) before and after the reaction becomes a negative value. In a case where the excess oxygen ratio $\lambda$ is approximately 0.1 or greater, combustion heat is obtained.

The ratio between ammonia and oxygen in the supply gas is preferably in a range of 0.1 to 24, more preferably in a range of 0.5 to 7, still more preferably in a range of 1 to 6, and particularly preferably in a range of 2 to 6 in terms of the excess oxygen ratio $\lambda$ described above.

The supply gas may contain gas other than ammonia and oxygen. For example, the supply gas may contain rare gas such as nitrogen or argon or gas inert to ammonia combustion such as carbon dioxide.

It is preferable that the reaction temperature (temperature in the reactor) is adjusted to be in a range of, for example, 200° C. to 900° C.

The flow rate of the supply gas that circulates through the reactor may be set in consideration of the reaction scale or the like and is preferably in a range of 1 mL·min$^{-1}$ to 100 L·min$^{-1}$ and more preferably in a range of 10 mL·min$^{-1}$ to 10 L·min$^{-1}$.

According to the ammonia combustion method of the present invention described above, generation of fuel $NO_x$ or thermal $NO_x$ is significantly suppressed so that nitrogen and water are generated by burning ammonia in the presence of the supported catalyst of the present invention. According to such an ammonia combustion method, the effect of suppressing generation of NO and generation of $N_2O$ and the $N_2$ selectivity are significant and zero emission in ammonia combustion can be realized.

Hydrogen Production Method

A hydrogen production method of the present invention is a method of producing hydrogen from ammonia.

Such a hydrogen production method includes an ammonia combustion step of reacting ammonia with oxygen in the presence of the supported catalyst of the present invention; and an ammonia decomposition step of decomposing the ammonia into hydrogen and nitrogen by utilizing heat generated by the reaction between the ammonia and the oxygen.

As the hydrogen production method of the present invention, a first embodiment and a second embodiment described below are exemplified.

Hereinafter, each embodiment will be described with reference to the accompanying drawings.

First Embodiment

Figure 2:
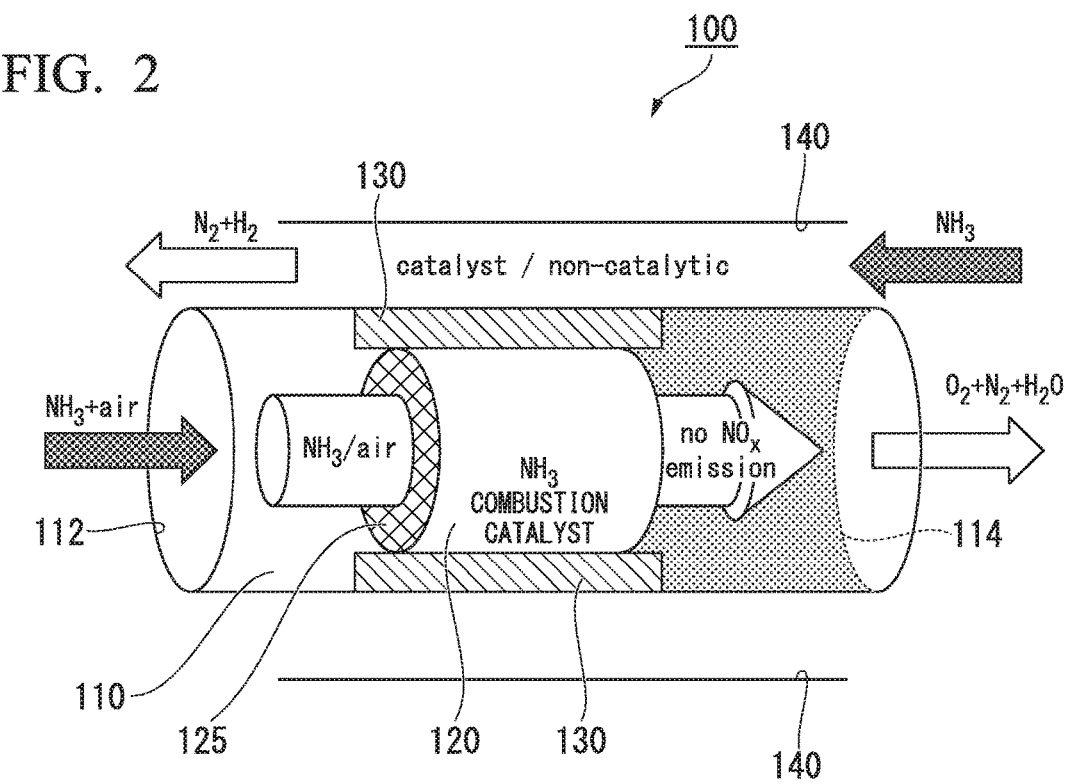
FIG. 2 is a schematic view illustrating an embodiment of a hydrogen production device.

FIG. 2 illustrates one embodiment of a hydrogen production device, that is, a so-called external combustion device.

A hydrogen production device 100 illustrated in FIG. 2 is schematically configured of a cylindrical reactor 110; an ammonia combustion unit 120 which is disposed in the reactor 110 and formed of a cylindrical reactor; and a flow path 140 in which ammonia is circulated.

A support portion 130 provided along the inner peripheral surface of the reactor 110 is interposed between the reactor 110 and the ammonia combustion unit 120 so that the ammonia combustion unit 120 is fixed in the reactor 110. In FIG. 2, a supported catalyst 125 formed in a honeycomb structure is provided in the ammonia combustion unit 120. The above-described supported catalyst of the present invention is applied to the supported catalyst 125 as an ammonia combustion catalyst.

The flow path 140 is provided along the outer periphery of the reactor 110.

[Ammonia Combustion Step (1)]

An operation of an ammonia combustion step (1) may be performed according to the above-described ammonia combustion method of the present invention.

For example, in the reactor 110 of the hydrogen production device 100, ammonia and air are supplied from one opening portion 112 toward the other opening portion 114. In this manner, supply gas containing ammonia and air is circulated in the ammonia combustion unit 120 while being brought into contact with the supported catalyst 125. At this time, ammonia and an excess amount of oxygen in air with respect to the ammonia react (burn) with each other to generate nitrogen and water, and the generated nitrogen, water, and unreacted oxygen flow out from the other opening portion 114. The reaction between ammonia and oxygen, that is, ammonia combustion is an exothermic reaction and is accompanied by generation of heat. Further, the temperature of the reactor 110 on the side of the opening portion 114 increases up to, for example, 900° C.

[Ammonia Decomposition Step (1)]

An operation of an ammonia decomposition step (1) is performed by supplying ammonia to the flow path 140 in a direction opposite to the direction of the supply gas in the reactor 110, that is, from the opening portion 114 side to the opening portion 112 side in the reactor 110 when the temperature in the flow path 140 is increased by the operation of the ammonia combustion step (1). In this manner, the ammonia circulating in the flow path 140 is heated with heat generated by the ammonia combustion and is decomposed into hydrogen and nitrogen, thereby producing hydrogen from ammonia. Here, since ammonia is decomposed even under a non-catalyst condition by utilizing heat generated by ammonia combustion, hydrogen can be produced by reducing heat supply from the outside (auto thermal state).

Second Embodiment

Figure 3:
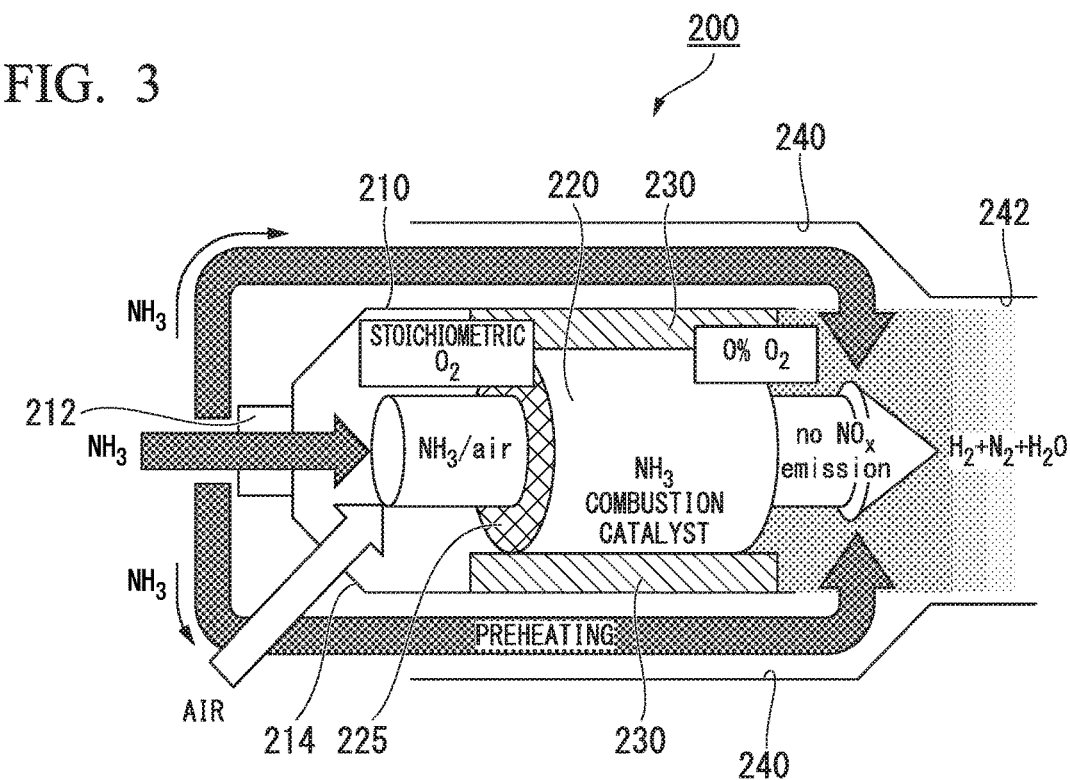
FIG. 3 is a schematic view illustrating another embodiment of a hydrogen production device.

FIG. 3 illustrates another embodiment of a hydrogen production device, that is, a so-called internal combustion device.

A hydrogen production device 200 illustrated in FIG. 3 is schematically configured of a substantially cylindrical flow path 240 in which ammonia is circulated; a cylindrical reactor 210 which is disposed in the flow path 240; and an ammonia combustion unit 220 which is disposed in the reactor 210 and formed of a cylindrical reactor.

The flow path 240 is narrowed toward one opening portion 242 (in a circular shape).

A support portion 230 provided along the inner peripheral surface of the reactor 210 is interposed between the reactor 210 and the ammonia combustion unit 220 so that the ammonia combustion unit 220 is fixed in the reactor 210. In FIG. 3, a supported catalyst 225 formed in a honeycomb structure is provided in the ammonia combustion unit 220.

The above-described supported catalyst of the present invention is applied to the supported catalyst 225 as an ammonia combustion catalyst.

[Ammonia Combustion Step (2)]

An operation of an ammonia combustion step (2) may be performed in the same manner as the operation of the above-described ammonia combustion step (1).

For example, in the reactor 210 of the hydrogen production device 200, ammonia is supplied from an ammonia supply port 212 and air is supplied from an air supply port 214. At this time, it is preferable that the amount of oxygen to be supplied in the air is set as a stoichiometric amount (¾ mol of oxygen with respect to 1 mol of ammonia) in ammonia combustion. In this manner, supply gas containing ammonia and air is circulated in the ammonia combustion unit 220 while being brought into contact with the supported catalyst 225. At this time, ammonia and oxygen in air react (burn) with each other to generate nitrogen and water, and the generated nitrogen and water flow out to the opening portion 242 side of the flow path 240. The ammonia combustion is an exothermic reaction and is accompanied by generation of heat. Further, the temperature of the flow path 240 on the side of the opening portion 242 increases up to, for example, 900° C.

[Ammonia Decomposition Step (2)]

For example, an operation of an ammonia decomposition step (2) is performed as follows.

When the temperature in the flow path 240 on the side of the opening portion 242 is increased by the operation of the ammonia combustion step (2), pre-heated ammonia is supplied to the flow path 240 in the same direction as that of the supply gas in the reactor 210, that is, from the ammonia supply port 212 side of the reactor 210 toward the opening portion 242 side of the flow path 240. In this manner, the ammonia circulating in the flow path 240 and reaching the opening portion 242 side is heated with heat generated by the ammonia combustion and is decomposed into hydrogen and nitrogen, thereby producing hydrogen from ammonia.

Further, the nitrogen and water generated in the ammonia combustion step (2) and the hydrogen and nitrogen generated in the ammonia decomposition step (2) flow out from the opening portion 242 of the flow path 240.

The above-described hydrogen production method of the present invention includes an ammonia combustion step and an ammonia decomposition step, and heat supply from the outside can be reduced by combining two reactions of ammonia combustion and ammonia decomposition, thereby producing hydrogen (auto thermal state).

According to such a hydrogen production method, for example, the amount of fuel $NO_x$ to be generated is several ppm and heat at approximately 900° C. is generated by ammonia combustion in the presence of the supported catalyst of the present invention, and thus ammonia can be decomposed by utilizing the heat to produce hydrogen. Since the oxygen concentration on the downstream side becomes zero in a case where the excess oxygen ratio λ is 1, a NO decomposition system that uses an existing NO decomposition catalyst or the like can be introduced.

Further, since the hydrogen production method depends on a gas phase decomposition reaction in a case where the ammonia decomposition is carried out under a non-catalyst condition, a large amount of hydrogen can be easily produced in a three-dimensional reaction space in a short time.

The hydrogen production method of the present invention has been described based on the first embodiment and the second embodiment, but such a hydrogen production method is not limited to these and can be performed based on other embodiments.

According to the above-described first embodiment, the ammonia combustion unit 120 is disposed in the reactor 110, but the present invention is not limited thereto. For example, an embodiment in which the ammonia combustion unit 120 is disposed in the flow path 140, ammonia is burned by circulating supply gas containing ammonia and air to the flow path 140, and ammonia is decomposed by supplying ammonia into the reactor 110 may be also employed.

According to the above-described second embodiment, the ammonia combustion unit 220 is disposed in the reactor 210, but the present invention is not limited thereto. For example, an embodiment in which the ammonia combustion unit 220 is disposed in the flow path 240, ammonia is burned by circulating supply gas containing ammonia and air in the flow path 240, and ammonia is decomposed by supplying ammonia into the reactor 210 may be also employed.

EXAMPLES

Hereinafter, the present invention will be described in more detail with reference to examples, but the present invention is not limited to these examples.

Production of $\alpha Al_2O_3 \cdot \beta B_2O_3$ Carrier $10Al_2O_3 \cdot 2B_2O_3$ was synthesized according to a reverse coprecipitation method.

$Al(NO_3)_3 \cdot 9H_2O$ and $H_3BO_3$ were respectively weighed such that the molar ratio of $Al(NO_3)_3 \cdot 9H_2O$ to $H_3BO_3$ was set to 10:2 and were dissolved in ion exchange water.

This solution was slowly added dropwise to an ammonium carbonate aqueous solution for coprecipitation and dried under reduced pressure using an evaporator. Next, the resultant was dried at 110° C. overnight and baked at 500° C. for 3 hours and then at 1000° C. for 5 hours, thereby obtaining a Mullite type crystal structure system $10Al_2O_3 \cdot 2B_2O_3$ (also written as $Al_5BO_9$ or $Al_{20}B_4O_{36}$).

$2Al_2O_3 \cdot B_2O_3$ was synthesized according to a solid phase method.

$Al_2O_3$ and $B_2O_3$ were respectively weighed such that the molar ratio of $Al_2O_3$ to $B_2O_3$ was set to 2:1 and were mixed with each other using an agate mortar. This mixture was baked at 900° C. for 24 hours, thereby obtaining a Mullite type crystal structure system $2Al_2O_3 \cdot B_2O_3$ (also written as $Al_4B_2O_9$).

The above-described two kinds of $\alpha Al_2O_3 \cdot \beta B_2O_3$ ($10Al_2O_3 \cdot 2B_2O_3$ and $2Al_2O_3 \cdot B_2O_3$) can be synthesized by using any of the reverse coprecipitation method and the solid phase method.

Production (1) of Supported Catalyst or the Like

A supported catalyst and the like of each example were produced in the following manner using CuO as a catalyst composition and various carriers according to a wet impregnation method.

Each carrier was impregnated with $Cu(NO_3)_2$ such that the content of CuO was set to 6.0% by mass with respect to the total mass (100% by mass) of the supported catalyst and the like to obtain an impregnated body. Thereafter, the obtained impregnated body was baked in air whose temperature was adjusted to 600° C. for 3 hours, thereby obtaining a supported catalyst or the like.

An XRD method, an XRF method, and an XPS method were used for the characterization of the obtained supported catalyst or the like.

The specific surface area of the supported catalyst and the like is measured according to a $N_2$ adsorption (BET) method.

The supported catalysts or the like of each example are described below.

All of the catalysts of Test Examples 1 to 4 do not have a carrier. The supported catalysts of Test Examples 11 and 12, to which the present invention was applied, are the supported catalysts of Examples 1 and 2.

Further, $Pt/\gamma\text{-}Al_2O_3$ (1) which is a typical supported catalyst was used as a supported catalyst in Test Example 19. The proportion of Pt in the supported catalyst was 1.0% by mass with respect to the total mass (100% by mass) of the supported catalyst.

Test Example 1: $Cu_2O$

Test Example 2: $CuO$

Test Example 3: $CuAlO_2$

Test Example 4: $CuAl_2O_4$

Test Example 5: CuO/zeolite (NaY Type)

Test Example 6: $CuO/MgO$

Test Example 7: $CuO/\gamma\text{-}Al_2O_3$ (1)

Test Example 8: $CuO/\gamma\text{-}Al_2O_3$ (2)

Test Example 9: $CuO/\alpha\text{-}Al_2O_3$ (1)

Test Example 10: $CuO/\alpha\text{-}Al_2O_3$ (2)

Test Example 11: $CuO/10Al_2O_3 \cdot 2B_2O_3$

Test Example 12: $CuO/2Al_2O_3 \cdot B_2O_3$

Test Example 13: $CuO/AlPO_4$

Test Example 14: $CuO/SiO_2$

Test Example 15: $CuO/TiO_2$ (Anatase Type)

Test Example 16: $CuO/ZrO_2$

Test Example 17: $CuO/La_2O_3$

Test Example 18: $CuO/CeO_2$

Test Example 19: $Pt/\gamma\text{-}Al_2O_3$ (1)

As the result of characterization using an XRD method, in the supported catalysts of Test Examples 11 to 16 which contained a $10Al_2O_3 \cdot 2B_2O_3$ carrier, a $2Al_2O_3 \cdot B_2O_3$ carrier, an $AlPO_4$ carrier, a $SiO_2$ carrier, a $TiO_2$ (anatase type) carrier, and a $ZrO_2$ carrier, it was confirmed that a diffraction line belonging to CuO appeared and CuO was supported by a carrier.

In addition, peaks generated due to Cu were not found in the supported catalysts of the test examples.

In a phase diagram of a binary oxide containing Cu, it is assumed that Cu exists as a single oxide in the coexistence of $MgO$, $CeO_2$, $\gamma\text{-}A_{12}O_3$, or $\alpha\text{-}Al_2O_3$ and forms a composite oxide with $La_2O_3$ in the coexistence with $La_2O_3$. In regard to zeolite (NaY type), performance deterioration caused by collapse of the carrier structure was confirmed through the reaction test which was repeatedly performed three times.

Production (2) of Supported Catalyst or the Like

A supported catalyst $CuO/10Al_2O_3 \cdot 2B_2O_3$ was obtained in the same manner as that for the production (1) of the supported catalyst or the like described above except that a $10Al_2O_3 \cdot 2B_2O_3$ carrier was impregnated with $Cu(NO_3)_2$ such that the content of CuO was set to be different from the value as described above with respect to the total mass (100% by mass) of the supported catalyst and the like using CuO as a catalyst composition and $10Al_2O_3 \cdot 2B_2O_3$ as a carrier.

Ammonia Combustion (1)

Ammonia combustion was performed by circulating supply gas (excess oxygen ratio $\lambda=2$) containing 1.0% of ammonia and 1.5% of oxygen through a reactor filled with respective supported catalysts and the like of each example such that the supply gas was brought into contact with the supported catalysts and the like using a circulation type reaction device provided with a reactor. The amount of the supported catalyst and the like to be used was set to 50 mg.

At the time of changing the excess oxygen ratio $\lambda$, the supply gas with the following oxygen concentration was supplied into the reactor by fixing the concentration of ammonia to 1.0%.

In a case where $\lambda$ was 1, the concentration of oxygen was 0.75%

In a case where $\lambda$ was 2, the concentration of oxygen was 1.5%

In a case where $\lambda$ was 3, the concentration of oxygen was 2.25%

In a case where $\lambda$ was 4, the concentration of oxygen was 3.0%

In a case where $\lambda$ was 5, the concentration of oxygen was 3.75%

Ammonia Combustion (2)

Ammonia combustion was performed in the same manner as that for the above-described ammonia combustion (1) except that the excess oxygen ratio $\lambda$ was changed to 3, 4, or 5.

The ammonia combustion (1) and the ammonia combustion (2) were performed while the temperature in the reactor was increased by 10° C./min from room temperature (25° C.) to 900° C. The flow rate of the supply gas circulating through the reactor was set to 100 $mL \cdot min^{-1}$.

During the ammonia combustion, the ammonia conversion ratio, the combustion activity ($T_{10}$), the product selectivity ($NO_2$ selectivity, NO selectivity, $N_2O$ selectivity, or $N_2$ selectivity) were respectively acquired.

[Ammonia Conversion Ratio]

The ammonia conversion ratio was measured using an infrared gas analysis meter EIA-51d (manufactured by HORIBA, Ltd.) according to a non-dispersive infrared absorption method.

[Combustion Activity ($T_{10}$)]

The temperature in the reactor when the ammonia conversion ratio reached 10% was measured.

[Product Selectivity ($NO_2$ Selectivity, NO Selectivity, $N_2O$ Selectivity, or $N_2$ Selectivity)]

The $NO_2$ selectivity was measured using a chemiluminescence type nitrogen oxide concentration meter NOA-7000 (manufactured by Shimadzu Corporation).

The NO selectivity was measured using an infrared gas analysis meter VA-3011 (manufactured by HORIBA, Ltd.) according to a non-dispersive infrared absorption method.

The $N_2O$ selectivity was measured using VA-3011 (manufactured by HORIBA, Ltd.) according to a non-dispersive infrared absorption method.

The $N_2$ selectivity was measured using a gas chromatography GC-8A (manufactured by Shimadzu Corporation).

The combustion activity ($T_{10}$), the $N_2$ selectivity, the $N_2O$ selectivity, and the NO selectivity of each catalyst of Test Examples 1 to 4 are listed in Table 1.

TABLE 1

| λ = 2 | | $T_{10}$/ °C. | Selectivity at 600° C./% | | |
|---|---|---|---|---|---|
| | | | $N_2$ | $N_2O$ | NO |
| Test Example 1 | $Cu_2O$ | 354 | 97 | <1 | 3 |
| Test Example 2 | CuO | 303 | 91 | <1 | 9 |
| Test Example 3 | $CuAlO_2$ | 287 | 81 | 2 | 19 |
| Test Example 4 | $CuAl_2O_4$ | 321 | 87 | <1 | 13 |

The specific surface area, the combustion activity ($T_{10}$), the $N_2$ selectivity, the $N_2O$ selectivity, and the NO selectivity of each supported catalyst of Test Examples 5 to 19 are listed in Table 2.

TABLE 2

| λ = 2 | | Specific surface area/$m^2 \cdot g^{-1}$ | $T_{10}$/ °C. | Selectivity at 600° C./% | | |
|---|---|---|---|---|---|---|
| | | | | $N_2$ | $N_2O$ | NO |
| Test Example 5 | CuO/zeolite (NaY type) | 826 | 334 | 83 | 1 | 16 |
| Test Example 6 | CuO/MgO | 33 | 360 | 71 | <1 | 29 |
| Test Example 7 | CuO/γ-$Al_2O_3$ (1) | 149 | 303 | 85 | 3 | 12 |
| Test Example 8 | CuO/γ-$Al_2O_3$ (2) | 29 | 311 | 86 | 2 | 12 |
| Test Example 9 | CuO/α-$Al_2O_3$ (1) | 3 | 297 | 79 | 1 | 20 |
| Test Example 10 | CuO/α-$Al_2O_3$ (2) | 2 | 337 | 87 | <1 | 13 |
| Test Example 11 | CuO/$10Al_2O_3 \cdot 2B_2O_3$ | 77 | 307 | 94 | <1 | 6 |
| Test Example 12 | CuO/$2Al_2O_3 \cdot B_2O_3$ | 62 | 322 | 93 | 4 | 3 |
| Test Example 13 | CuO/$AlPO_4$ | 64 | 351 | 90 | 4 | 6 |
| Test Example 14 | CuO/$SiO_2$ | 177 | 334 | 93 | <1 | 7 |
| Test Example 15 | CuO/$TiO_2$ (anatase type) | 9 | 340 | 63 | 1 | 36 |
| Test Example 16 | CuO/$ZrO_2$ | 11 | 306 | 69 | <1 | 31 |
| Test Example 17 | CuO/$La_2O_3$ | 13 | 290 | 53 | <1 | 47 |
| Test Example 18 | CuO/$CeO_2$ | 137 | 301 | 83 | <1 | 17 |
| Test Example 19 | Pt/γ-$Al_2O_3$ (1) | 160 | 270 | 65 | <1 | 35 |

Regarding Catalytic Activity

From the results listed in Table 2, it was confirmed that the $T_{10}$ value was small and the low temperature activity was high in cases of the supported catalysts and the like of Test Example 7 (CuO/γ-$Al_2O_3$ (1)), Test Example 8 (CuO/γ-$Al_2O_3$ (2)), Test Example 9 (CuO/α-$Al_2O_3$ (1)), Test Example 11 (CuO/$10Al_2O_3 \cdot 2B_2O_3$), Test Example 12 (CuO/$2Al_2O_3 \cdot B_2O_3$), Test Example 16 (CuO/$ZrO_2$), Test Example 17 (CuO/$La_2O_3$), and Test Example 18 (CuO/$CeO_2$).

Regarding Product Selectivity

From the results listed in Table 2, it was confirmed that the $N_2$ selectivity was greater than 90% in cases of the supported catalysts and the like of Test Example 11 (CuO/$10Al_2O_3 \cdot 2B_2O_3$), Test Example 12 (CuO/$2Al_2O_3 \cdot B_2O_3$), Test Example 13 (CuO/$AlPO_4$), and Test Example 14 (CuO/$SiO_2$).

Among the supported catalysts described above, it was confirmed that the supported catalysts of Test Example 11 (CuO/$10Al_2O_3 \cdot 2B_2O_3$) and Test Example 12 (CuO/$2Al_2O_3 \cdot B_2O_3$), to which the present invention was applied, had high catalytic activity and $N_2$ selectivity. Between these, it was confirmed that particularly the supported catalyst of Test Example 11 had high catalytic activity and $N_2$ selectivity.

Figure 4:
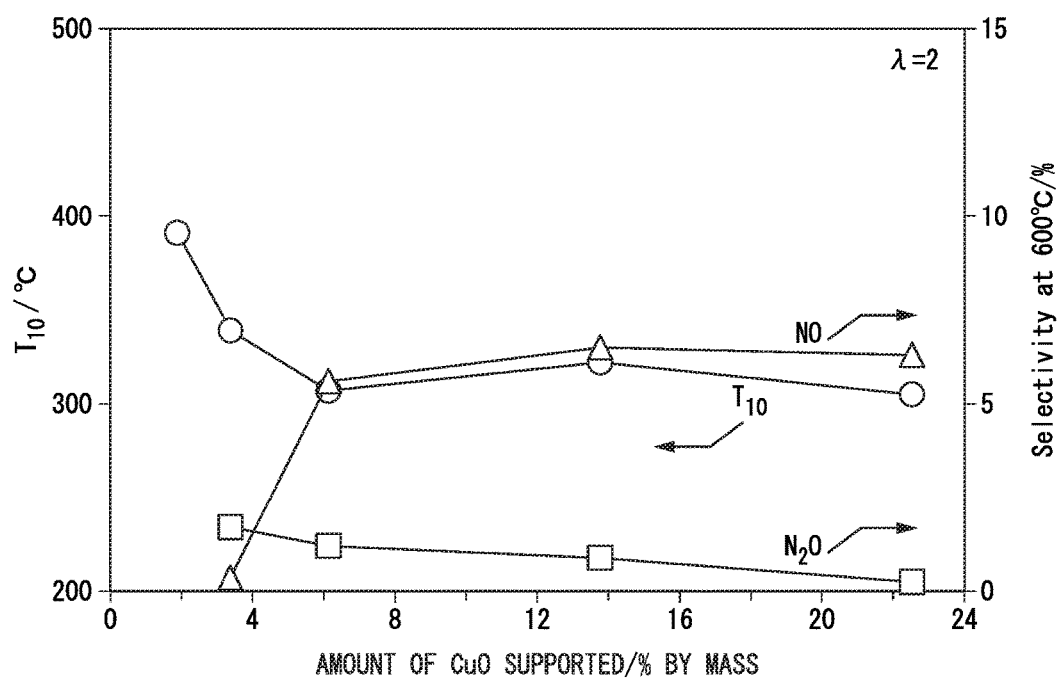
FIG. 4 is a graph showing dependence of the amount of CuO on catalytic activity and product selectivity in CuO/$10Al_2O_3 \cdot 2B_2O_3$.

FIG. 4 is a graph showing dependence of the amount of CuO on catalytic activity and product selectivity in the supported catalyst CuO/$10Al_2O_3 \cdot 2B_2O_3$ to which the present invention has been applied.

The graph of FIG. 4 shows the results of combustion activity ($T_{10}$), NO selectivity, and $N_2O$ selectivity acquired during the ammonia combustion (1) using supported catalysts CuO/$10Al_2O_3 \cdot 2B_2O_3$ with different amounts of CuO, which were obtained by production (2) of the supported catalyst and the like described above.

The horizontal axis indicates the proportion (amount of CuO to be supported/% by mass) of CuO supported by a carrier with respect to the total mass (100% by mass) of the supported catalysts (CuO/$10Al_2O_3 \cdot 2B_2O_3$).

As shown in FIG. 4, it was confirmed that the catalytic activity is high in ammonia combustion and generation of $NO_x$ is easily suppressed in a case where the amount of CuO to be supported is approximately 4% by mass or greater.

Figure 5:
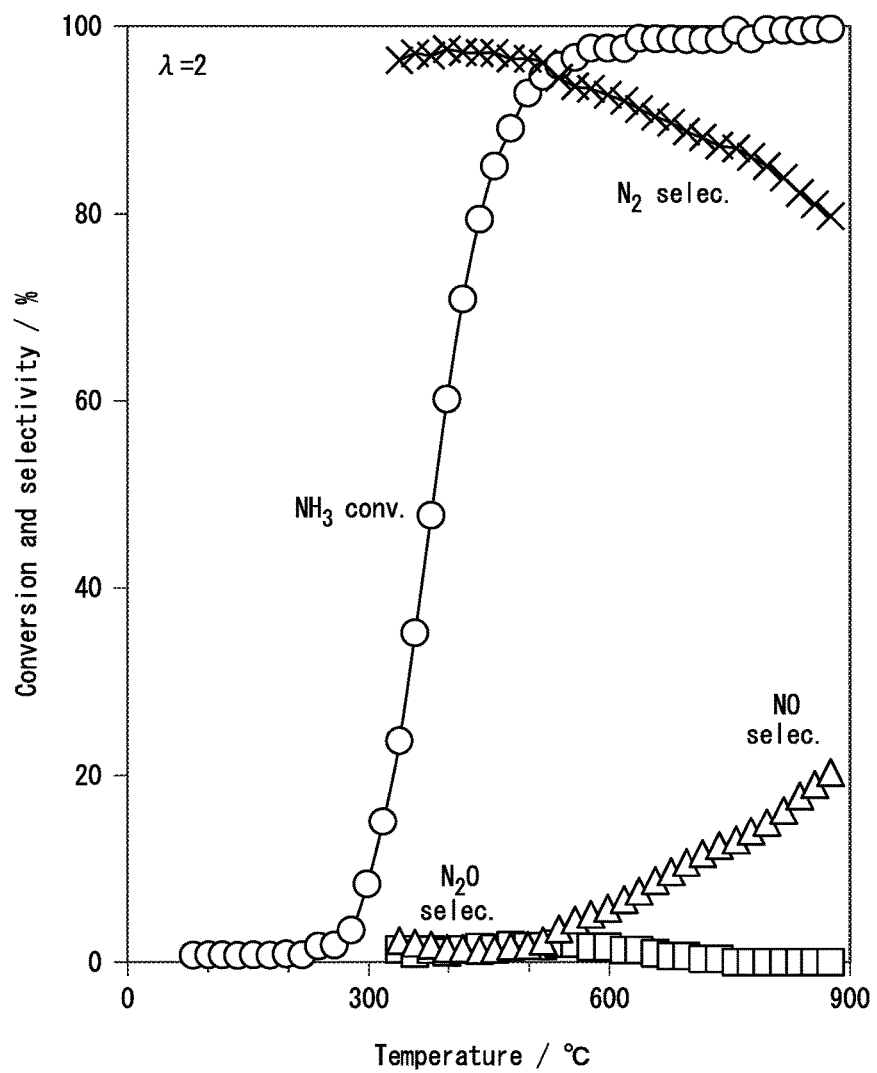
FIG. 5 is a graph showing each change in ammonia conversion ratio, $N_2$ selectivity, $N_2O$ selectivity, and NO selectivity in relation to temperature while ammonia is burned in the presence of CuO/$10Al_2O_3 \cdot 2B_2O_3$.
Figure 6:
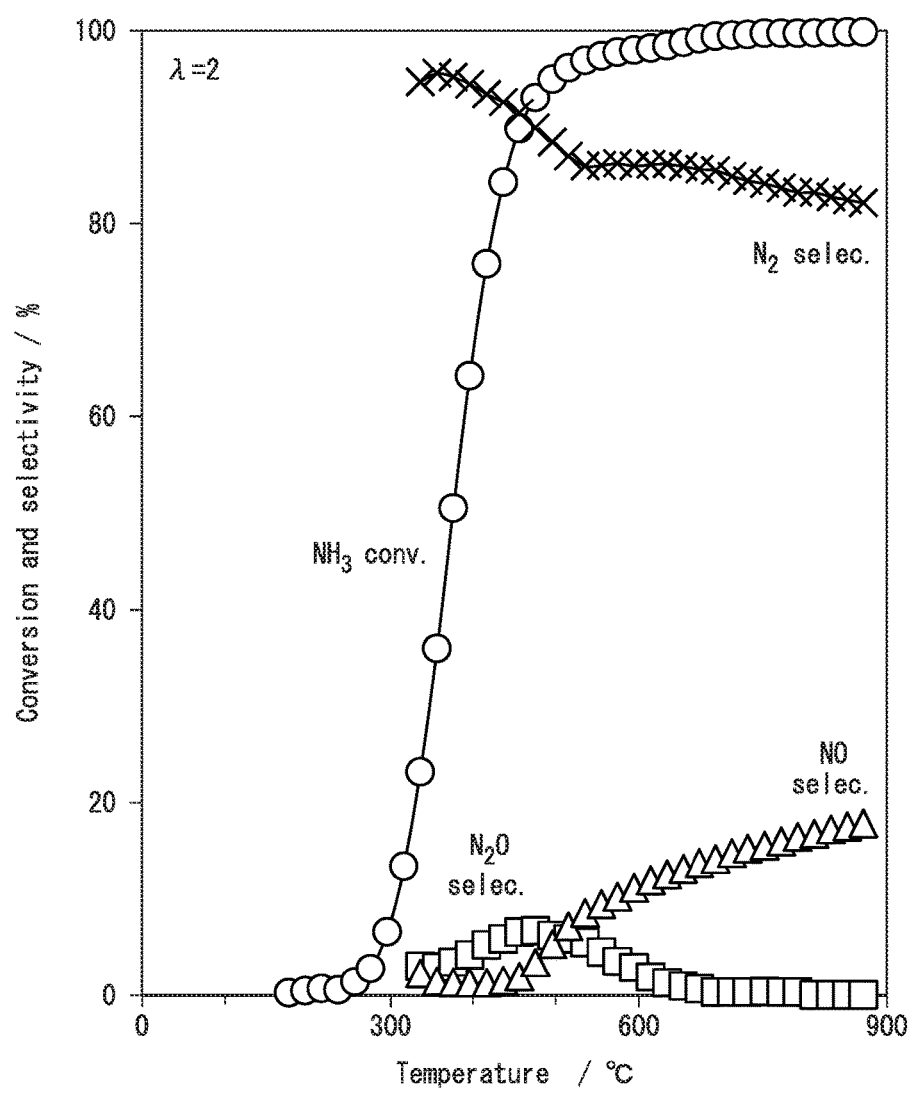
FIG. 6 is a graph showing each change in ammonia conversion ratio, $N_2$ selectivity, $N_2O$ selectivity, and NO selectivity in relation to temperature while ammonia is burned in the presence of CuO/$\gamma$-$Al_2O_3$ (1).
Figure 7:
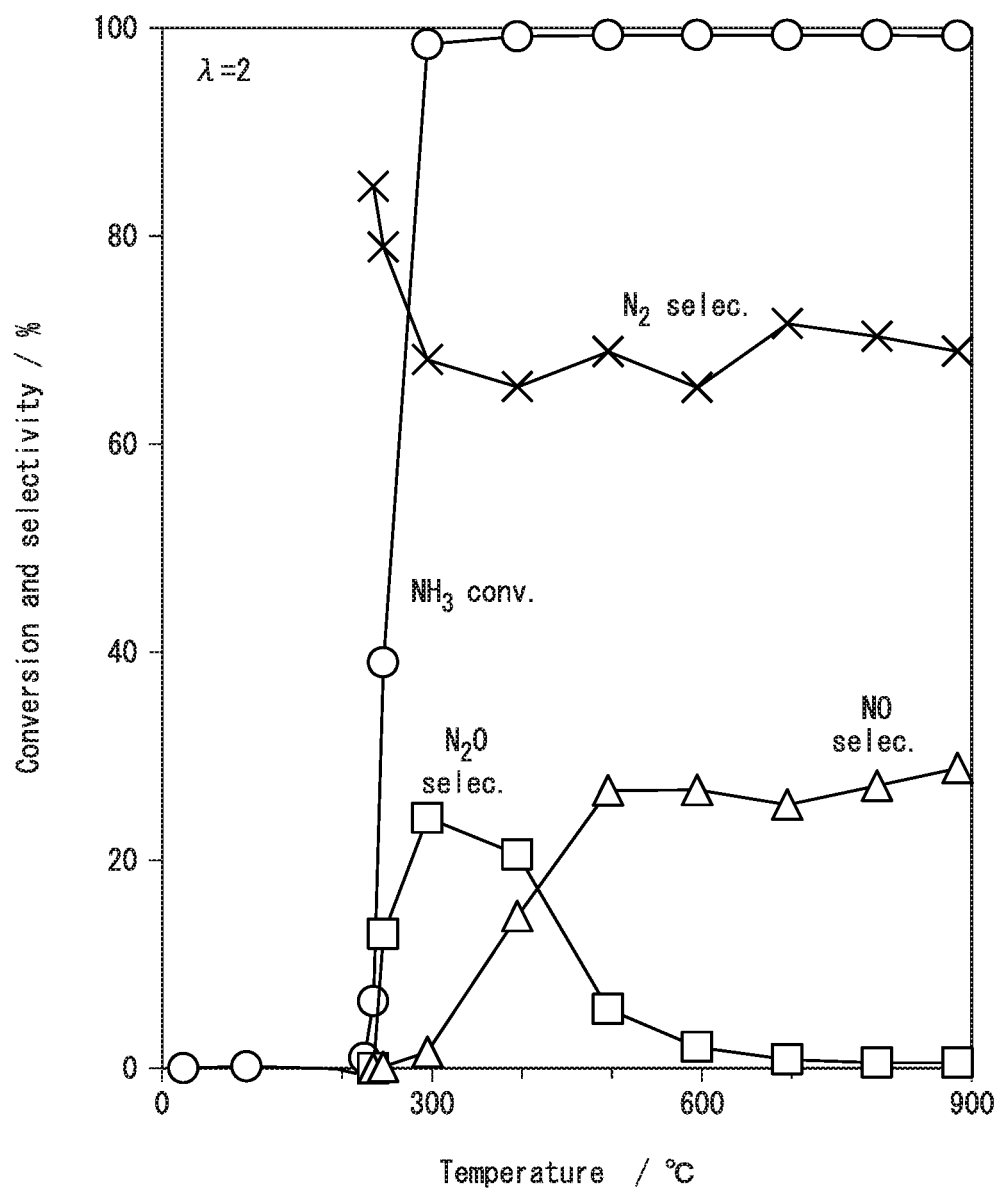
FIG. 7 is a graph showing each change in ammonia conversion ratio, $N_2$ selectivity, $N_2O$ selectivity, and NO selectivity in relation to temperature while ammonia is burned in the presence of Pt/$\gamma$-$Al_2O_3$ (1).

FIGS. 5 to 7 are graphs showing each change in ammonia conversion ratio, $N_2$ selectivity, $N_2O$ selectivity, and NO selectivity in relation to temperature while ammonia is burned in the presence of the supported catalysts and the like.

The graph of FIG. 5 shows the behavior while the ammonia combustion (1) was carried out using the supported catalyst (CuO/$10Al_2O_3 \cdot 2B_2O_3$) of Test Example 11 which was obtained by production (1) of the supported catalyst and the like described above.

The graph of FIG. 6 shows the behavior while the ammonia combustion (1) was carried out using the catalyst (CuO/γ-$Al_2O_3$ (1)) of Test Example 7 which was obtained by production (1) of the supported catalyst and the like described above.

The graph of FIG. 7 shows the behavior while the ammonia combustion (1) was carried out using the supported catalyst (Pt/γ-$Al_2O_3$ (1)) of Test Example 19.

FIGS. 5 and 6 show the same curve related to the $NH_3$ conversion ratio in a case where the catalysts of Test Examples 7 and 11 were used for the ammonia combustion. Further, in both cases, generation of NO is observed at a temperature of (approximately 600° C.) at which the ammonia combustion is almost completed.

In both cases, there is a significant difference in $N_2O$ selectivity. The $N_2O$ selectivity was decreased to approximately 1% (70 ppm) in a case where the supported catalyst of Test Example 11 was used while the maximum $N_2O$ selectivity was approximately 6% in a case where the catalyst of Test Example 7 was used. The reason for this is assumed that, in a case where the supported catalyst of Test Example 11 is used, the $N_2$ selectivity is improved because the reaction between ammonia and NO generated as a byproduct is promoted and generation of $N_2O$ is suppressed.

As shown in FIG. 7, in a case where the supported catalyst of Test Example 19 was used for the ammonia combustion, it was confirmed that the NO selectivity and the $N_2O$ selectivity were high and the $N_2$ selectivity was low compared to a case where the catalyst of Test Example 7 or 11 was used.

The ammonia conversion ratio and the product selectivity in relation to each reaction temperature during the ammonia combustion (2), in other words, during ammonia combustion carried out by changing the excess oxygen ratio λ to 2, 3, 4, and 5 using the catalysts of Test Examples 7 and 11 are listed in Tables 3 and 4.

The ammonia conversion ratio, the $N_2O$ selectivity, and the NO selectivity in relation to each reaction temperature in a case where the excess oxygen ratio was 2 or 3 are listed in Table 3.

The ammonia conversion ratio, the $N_2O$ selectivity, the NO selectivity, and the $NO_2$ selectivity in relation to each reaction temperature in a case where the excess oxygen ratio λ was 4 or 5 are listed in Table 4.

TABLE 3

| | Test Example 11 CuO/10Al$_2$O$_3$•2B$_2$O$_3$ | | | Test Example 7 CuO/γ-Al$_2$O$_3$ (1) | | |
|---|---|---|---|---|---|---|
| | Conv./% | Selectivity/% | | Conv./% | Selectivity/% | |
| λ = 2 | NH$_3$ | N$_2$O | NO | NH$_3$ | N$_2$O | NO |
| 300° C. | 8 | <1 | <1 | 4 | <1 | <1 |
| 400° C. | 63 | 1 | <1 | 63 | 5 | 2 |
| 500° C. | 94 | 2 | 1 | 92 | 6 | 6 |
| 600° C. | 98 | 1 | 6 | 95 | 3 | 12 |
| 700° C. | 99 | <1 | 11 | 96 | <1 | 15 |
| 800° C. | 99 | <1 | 9 | 97 | <1 | 17 |
| | Conv./% | Selectivity/% | | Conv./% | Selectivity/% | |
| λ = 3 | NH$_3$ | N$_2$O | NO | NH$_3$ | N$_2$O | NO |
| 300° C. | 5 | <1 | <1 | 12 | 3 | 1 |
| 400° C. | 54 | 2 | <1 | 68 | 6 | 1 |
| 500° C. | 87 | 3 | 3 | 95 | 7 | 4 |
| 600° C. | 97 | 2 | 7 | 98 | 2 | 12 |
| 700° C. | 98 | <1 | 11 | 99 | <1 | 20 |
| 800° C. | 99 | <1 | 9 | 99 | <1 | 23 |

TABLE 4

| | Test Example 11 CuO/10Al$_2$O$_3$•2B$_2$O$_3$ | | | | Test Example 7 CuO/γ-Al$_2$O$_3$ (1) | | | |
|---|---|---|---|---|---|---|---|---|
| | Conv./% | Selectivity/% | | | Conv./% | Selectivity/% | | |
| λ = 4 | NH$_3$ | N$_2$O | NO | NO$_2$ | NH$_3$ | N$_2$O | NO | NO$_2$ |
| 300° C. | 7 | <1 | <1 | <1 | 4 | <1 | <1 | <1 |
| 400° C. | 56 | 2 | 2 | <1 | 59 | 6 | 1 | <1 |
| 500° C. | 80 | 3 | 3 | <1 | 88 | 8 | 4 | <1 |
| 600° C. | 96 | 2 | 7 | <1 | 95 | 3 | 11 | <1 |
| 700° C. | 98 | <1 | 13 | <1 | 96 | <1 | 18 | 2 |
| 800° C. | 99 | <1 | 16 | <1 | 96 | <1 | 21 | 2 |
| | Conv./% | Selectivity/% | | | Conv./% | Selectivity/% | | |
| λ = 5 | NH$_3$ | N$_2$O | NO | NO$_2$ | NH$_3$ | N$_2$O | NO | NO$_2$ |
| 300° C. | 7 | <1 | <1 | <1 | 6 | <1 | 5 | <1 |
| 400° C. | 54 | 3 | 2 | <1 | 57 | 6 | 2 | <1 |
| 500° C. | 86 | 4 | 3 | <1 | 91 | 8 | 5 | <1 |
| 600° C. | 97 | 3 | 7 | <1 | 97 | 4 | 12 | <1 |
| 700° C. | 98 | 1 | 13 | <1 | 99 | <1 | 17 | <1 |
| 800° C. | 98 | <1 | 25 | 1 | 99 | <1 | 24 | <1 |

From the results listed in Tables 3 and 4, for example, in a case where the reaction temperature was 600° C. in ammonia combustion with an excess oxygen ratio λ of 2, 3, 4, and 5, it was confirmed that the NO selectivity was low and generation of $NO_x$ was further suppressed in a case where the supported catalyst of Test Example 11 was used under all 2 conditions described above, compared to a case where the catalyst of Test Example 7 was used.

Further, in a case where the supported catalyst of Test Example 11 was used, it was confirmed that the $N_2O$ selectivity and the NO selectivity at a reaction temperature of 400° C. to 600° C. in ammonia combustion with an excess oxygen ratio λ of 2 were the lowest.

Heat Resistance

The catalysts of Test Examples 7 and 11 obtained by the production (1) of the supported catalyst and the like described above were heated while being stored in air whose temperature was adjusted to 900° C. for 500 hours.

The ammonia conversion ratio and the product selectivity in relation to each reaction temperature during the ammonia combustion (1) using the catalysts of Test Examples 7 and 11 after the catalysts were heated are listed in Tables 5 and 6.

The ammonia conversion ratio, the $N_2O$ selectivity, and the NO selectivity in relation to each reaction temperature in a case where the excess oxygen ratio was 2 or 3 are listed in Table 5.

The ammonia conversion ratio, the $N_2O$ selectivity, the NO selectivity, and the $NO_2$ selectivity in relation to each reaction temperature in a case where the excess oxygen ratio was 4 or 5 are listed in Table 6.

TABLE 5

| | Test Example 11 CuO/10Al$_2$O$_3$·2B$_2$O$_3$ | | | Test Example 7 CuO/γ-Al$_2$O$_3$ (1) | | |
|---|---|---|---|---|---|---|
| | Conv./% | Selectivity/% | | Conv./% | Selectivity/% | |
| λ = 2 | NH$_3$ | N$_2$O | NO | NH$_3$ | N$_2$O | NO |
| 300° C. | 3 | <1 | <1 | 12 | <1 | <1 |
| 400° C. | 48 | <1 | 2 | 67 | 6 | <1 |
| 500° C. | 84 | 2 | 1 | 95 | 9 | 2 |
| 600° C. | 95 | 2 | 2 | 98 | 5 | 7 |
| 700° C. | 98 | <1 | 9 | 99 | <1 | 11 |
| 800° C. | 99 | <1 | 12 | 99 | <1 | 11 |
| | Conv./% | Selectivity/% | | Conv./% | Selectivity/% | |
| λ = 3 | NH$_3$ | N$_2$O | NO | NH$_3$ | N$_2$O | NO |
| 300° C. | 5 | <1 | <1 | 11 | <1 | <1 |
| 400° C. | 40 | <1 | <1 | 67 | 7 | <1 |
| 500° C. | 75 | 2 | 1 | 93 | 11 | 4 |
| 600° C. | 93 | 2 | 2 | 97 | 5 | 10 |
| 700° C. | 96 | <1 | 9 | 98 | <1 | 15 |
| 800° C. | 98 | <1 | 18 | 98 | <1 | 16 |

TABLE 6

| | Test Example 11 CuO/10Al$_2$O$_3$·2B$_2$O$_3$ | | | | Test Example 7 CuO/γ-Al$_2$O$_3$ (1) | | | |
|---|---|---|---|---|---|---|---|---|
| | Conv./% | Selectivity/% | | | Conv./% | Selectivity/% | | |
| λ = 4 | NH$_3$ | N$_2$O | NO | NO$_2$ | NH$_3$ | N$_2$O | NO | NO$_2$ |
| 300° C. | 5 | <1 | <1 | <1 | 14 | 2 | <1 | <1 |
| 400° C. | 45 | <1 | <1 | <1 | 60 | 7 | 1 | <1 |
| 500° C. | 82 | 1 | <1 | <1 | 92 | 10 | 4 | <1 |
| 600° C. | 94 | 1 | <1 | <1 | 97 | 5 | 11 | <1 |
| 700° C. | 97 | <1 | 7 | <1 | 98 | 1 | 18 | <1 |
| 800° C. | 99 | <1 | 18 | <1 | 98 | <1 | 22 | 1 |
| | Conv./% | Selectivity/% | | | Conv./% | Selectivity/% | | |
| λ = 5 | NH$_3$ | N$_2$O | NO | NO$_2$ | NH$_3$ | N$_2$O | NO | NO$_2$ |
| 300° C. | 7 | <1 | <1 | <1 | 13 | 6 | 6 | <1 |
| 400° C | 51 | 3 | 3 | <1 | 56 | 10 | 3 | <1 |
| 500° C. | 84 | 3 | 2 | <1 | 84 | 12 | 5 | <1 |
| 600° C. | 94 | 3 | 4 | <1 | 92 | 6 | 12 | <1 |
| 700° C. | 97 | 1 | 11 | <1 | 97 | <1 | 19 | 1 |
| 800° C. | 98 | <1 | 23 | 1 | 97 | <1 | 21 | 2 |

From the results listed in Tables 5 and 6, it was confirmed that the N$_2$O selectivity and the NO selectivity were low in a case where the supported catalyst of Test Example 11 was used for the ammonia combustion to the same extent as those before the catalyst was heated. In other words, the supported catalyst of Test Example 11 has excellent heat resistance.

Reaction of Ammonia, NO, and Oxygen

Figure 8:
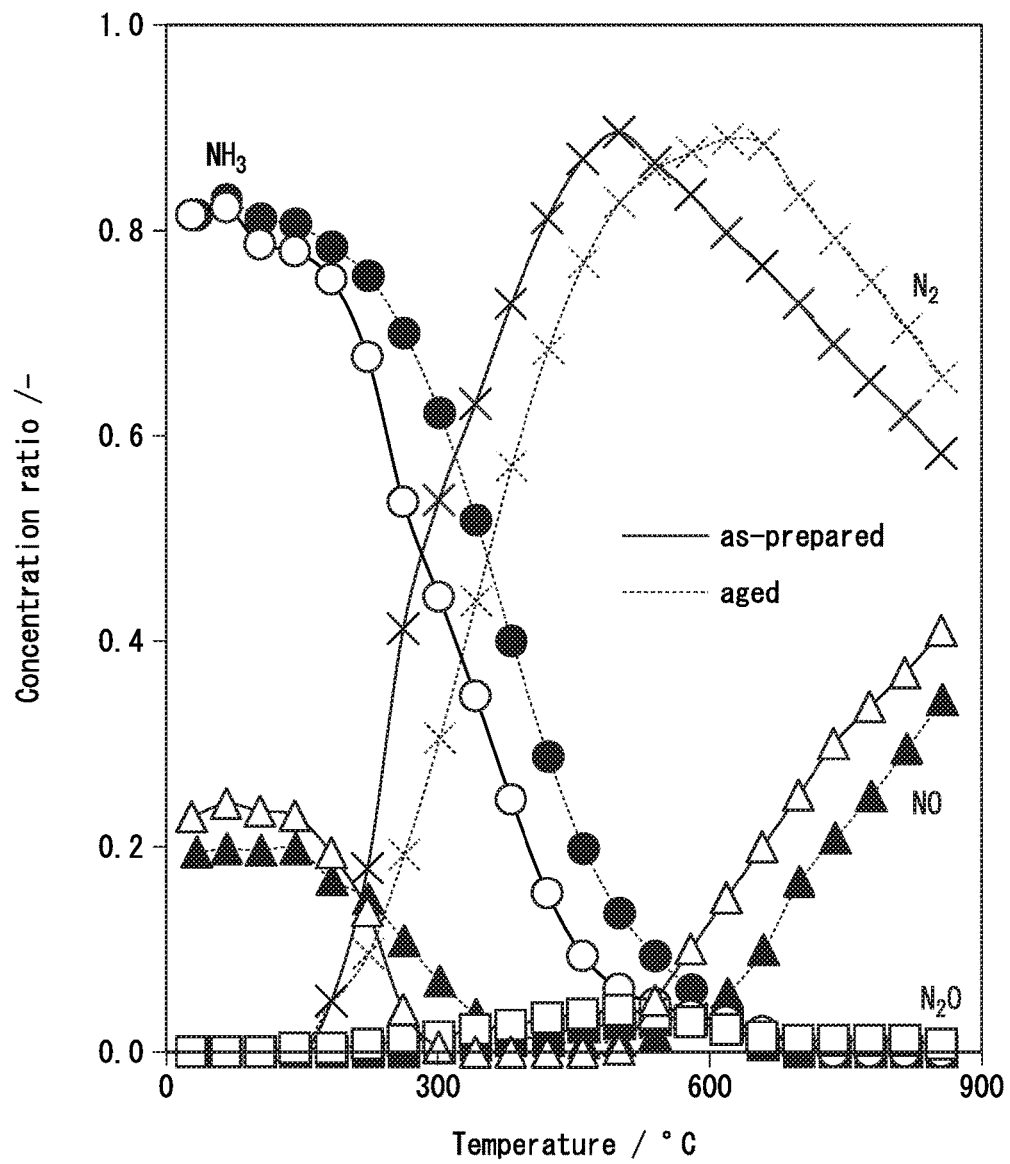
FIG. 8 is a graph showing each change in ammonia concentration ratio, $N_2$ concentration ratio, $N_2O$ concentration ratio, and NO concentration ratio in relation to temperature while ammonia, NO, and oxygen are caused to react with one another in the presence of a supported catalyst (as-prepared and aged) of Test Example 11 (CuO/$10Al_2O_3 \cdot 2B_2O_3$).
Figure 9:
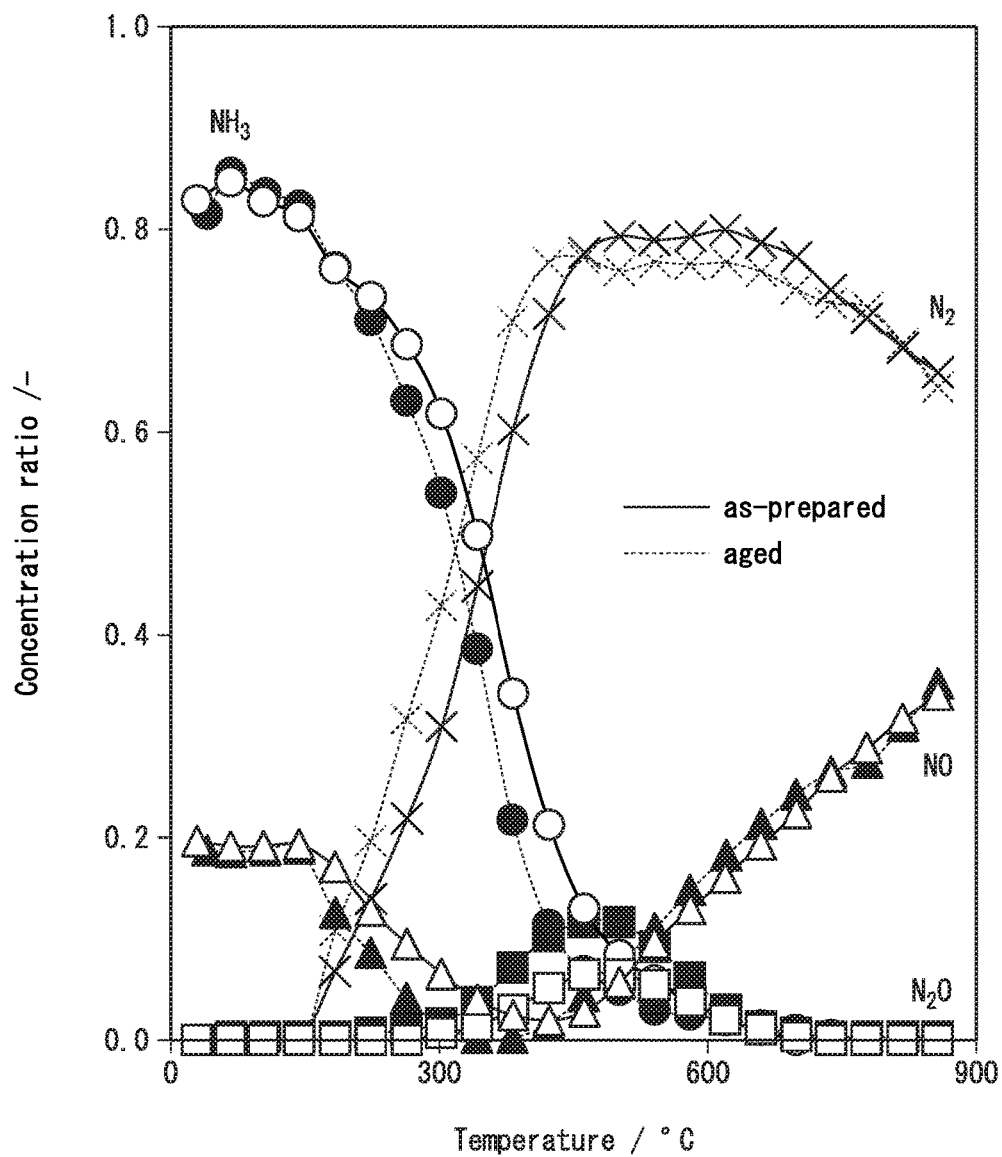
FIG. 9 is a graph showing each change in ammonia concentration ratio, $N_2$ concentration ratio, $N_2O$ concentration ratio, and NO concentration ratio in relation to temperature while ammonia, NO, and oxygen are caused to react with one another in the presence of a supported catalyst (as-prepared and aged) of Test Example 7 (CuO/$\gamma$-$Al_2O_3$ (1)).

FIGS. 8 and 9 are graphs showing each change in ammonia concentration ratio, N$_2$ concentration ratio, N$_2$O concentration ratio, and NO concentration ratio in relation to temperature while ammonia, NO, and oxygen are caused to react with one another in the presence of a supported catalyst.

The graph of FIG. 8 shows the behavior while ammonia, NO, and oxygen described below was caused to react with one another using the supported catalyst (as-prepared) and the supported catalyst (aged) of Test Example 11 (CuO/10Al$_2$O$_3$.2B$_2$O$_3$) obtained by the production (1) of the supported catalyst and the like described above.

As the supported catalyst (aged) of Test Example 11, the supported catalyst (as-prepared) of Test Example 11 which was deteriorated by being subjected to a heat treatment in air at 900° C. for 100 hours was used.

The graph of FIG. 9 shows the behavior while the reaction of ammonia, NO, and oxygen described below was carried out using the catalyst (as-prepared) and the catalyst (aged) of Test Example 7 (CuO/γ-Al$_2$O$_3$ (1)) obtained by the production (1) of the supported catalyst and the like described above.

As the catalyst (aged) of Test Example 7, the catalyst (as-prepared) of Test Example 7 which was deteriorated by being subjected to a heat treatment in air at 900° C. for 100 hours was used.

The reaction of ammonia, NO, and oxygen was carried out by circulating supply gas (excess oxygen ratio λ=2) containing 0.8% of ammonia, 0.2% of nitrogen monoxide, 1.4% of oxygen, and helium in balance through a reactor filled with respective supported catalysts and the like of each example such that the supply gas was brought into contact with the supported catalysts and the like using a circulation type reaction device provided with a reactor. The amount of the supported catalyst and the like to be used was set to 50 mg.

The reaction of ammonia, NO, and oxygen was carried out while the temperature in the reactor was increased by 10° C./min from room temperature (25° C.) to 900° C. The flow rate of the supply gas circulating through the reactor was set to $5.0 \times 10^{-4}$ g·min·cm$^{-3}$.

As shown in FIGS. 8 and 9, in a case where the supported catalyst of Test Example 11 was used for the reaction of ammonia, NO, and oxygen, it was confirmed that the reactivity of ammonia and NO was high and the N$_2$ selectivity was high compared to a case where the catalyst of Test Example 7 was used.

Effects Obtained by Adding Silver to Catalyst Composition

The supported catalyst of Test Example 11 and the supported catalyst of Test Example 20 were used as the supported catalysts.

Supported catalyst of Test Example 11: $CuO/10Al_2O_3 \cdot 2B_2O_3$ (the content of CuO was 6.0% by mass with respect to the total mass (100% by mass) of the supported catalyst)

Supported catalyst of Test Example 20: $(CuO/Ag)/10Al_2O_3 \cdot 2B_2O_3$ (the content of CuO was 6.0% by mass and the content of Ag was 10.0% by mass with respect to the total mass (100% by mass) of the supported catalyst)

A supported catalyst of Test Example 20 was produced as follows.

A $10Al_2O_3 \cdot 2B_2O_3$ carrier was impregnated with $Cu(NO_3)_2$ and $AgNO_3$ such that the content of CuO was set to 6.0% by mass and the content of Ag was set to 10.0% by mass with respect to the total mass (100% by mass) of the supported catalyst to obtain an impregnated body. Thereafter, the obtained impregnated body was baked in air whose temperature was adjusted to 600° C. for 3 hours, thereby obtaining a supported catalyst of Test Example 20.

The combustion activity ($T_{10}$), the $N_2$ selectivity, the $N_2O$ selectivity, and the NO selectivity of each supported catalyst of Test Examples 11 and 20 are listed in Table 7.

In Table 7, the $N_2$ selectivity, the $N_2O$ selectivity, and the NO selectivity are values at a temperature ($T_{90}$) at which the ammonia conversion ratio reaches 90%.

TABLE 7

| | | $T_{10}$/ °C. | Selectivity at $T_{90}$/% | | |
|---|---|---|---|---|---|
| | | | $N_2$ | $N_2O$ | NO |
| Test Example 11 | $CuO/10Al_2O_3 \cdot 2B_2O_3$ | 307 | 97 | 2 | 1 |
| Text Example 20 | $(CuO/Ag)/10Al_2O_3 \cdot 2B_2O_3$ | 278 | 96 | 2 | 2 |

From the results listed in Table 7, it was confirmed that the supported catalyst of Test Example 20 to which silver was added had a small $T_{10}$ value and excellent low temperature activity compared to the supported catalyst of Test Example 11.

Effects of Obtaining Honeycomb Structure

Catalyst formed bodies of Test Examples 21 to 24 were produced in the following manner.

Catalyst Formed Bodies of Test Examples 21 and 22

A 10Al2O3.2B2O3 carrier and an Al2O3 carrier were impregnated with Cu(NO3)2 such that the content of CuO was set to 6.0% by mass with respect to the total mass (100% by mass) of the supported catalyst to obtain an impregnated body (supported catalyst in a slurry form). Thereafter, the obtained impregnated body was baked in air whose temperature was adjusted to 600° C. for 3 hours, thereby obtaining a formed body in a pellet form (as-prepared).

Next, the obtained formed body in a pellet form (as-prepared) was subjected to a heat treatment at 900° C. for 100 hours in an atmosphere where air was circulated, thereby obtaining a target catalyst formed body (aged) of Test Example 21 and a target catalyst formed body (aged) of Test Example 22.

Catalyst Formed Bodies of Test Examples 23 and 24

A honeycomb piece with a size of 3 cell×4 cell×15 mm was cut out from a 600 cpsi cordierite honeycomb (size of 1 cell: 0.96 mm×0.96 mm).

The honeycomb piece was immersed in the supported catalyst in a slurry form obtained in the above-described manner, taken out from the supported catalyst in a slurry form such that the amount of the supported catalyst to be attached was set to 0.05 g, and baked in air whose temperature was adjusted to 600° C. for 3 hours, thereby obtaining a formed body in a honeycomb form (as-prepared).

Thereafter, the obtained formed body in a honeycomb form (as-prepared) was subjected to a heat treatment at 900° C. for 100 hours in an atmosphere where air was circulated, thereby obtaining a target catalyst formed body (aged) of Test Example 23 and a target catalyst formed body (aged) of Test Example 24.

Ammonia combustion (3) was carried out by circulating supply gas (excess oxygen ratio λ=3.1) containing 8% of ammonia and 92% of air (18.6% of oxygen) through a reactor filled with respective catalyst formed bodies (aged) of each example such that the supply gas was brought into contact with the catalyst formed bodies (aged) using a circulation type reaction device provided with a reactor. The amount of the supported catalyst to be used was determined such that the amount of the formed body in a pellet form in Test Examples 21 and 22 was set to 50 mg and the amount of the supported catalyst attached to a honeycomb piece in Test Examples 23 and 24 was set to 50 mg.

The ammonia combustion (3) was carried out while the temperature in the reactor was increased by 10° C./min from room temperature (25° C.) to 600° C. The flow rate of the supply gas circulating through the reactor was set to $5.0 \times 10^{-4}$ g·min·cm$^{-3}$.

The $N_2O$ selectivity and the NO selectivity of each catalyst formed body (aged) of Test Examples 21 to 24 are listed in Table 8.

In Table 8, the $N_2O$ selectivity and the NO selectivity are values at a temperature ($T_{90}$) at which the ammonia conversion ratio reaches 90%.

TABLE 8

| | | | Selectivity at $T_{90}$/% | |
|---|---|---|---|---|
| | | | $N_2O$ | NO |
| Test Example 21 | $CuO/10Al_2O_3 \cdot 2B_2O_3$ (aged) | Pellet form | 5 | 1 |
| Test Example 22 | $CuO/Al_2O_3$ (aged) | Pellet form | 13 | 2 |
| Test Example 23 | $CuO/10Al_2O_3 \cdot 2B_2O_3$ (aged) | Honeycomb form | 4 | 1 |
| Test Example 24 | $CuO/Al_2O_3$ (aged) | Honeycomb form | 8 | 1 |

From the results listed in Table 8, it was confirmed that the catalyst formed body (aged) of Test Example 23 in a honeycomb structure form from among the catalyst formed bodies (aged) of Test Examples 21 to 24 had the lowest $N_2O$ selectivity and the lowest NO selectivity.

INDUSTRIAL APPLICABILITY

Ammonia is a combustible gas accompanied by heat generation and there is a possibility that ammonia can be widely utilized in internal combustion and external combustion engines such as automobiles, aircrafts, thermal power plants, and iron works as an alternative fuel for gasoline or light oil. Further, it is useful to apply the present invention to the combustion of such ammonia.

As the form of transporting ammonia, a form obtained by dissolving ammonia in water can also be considered and the ammonia combustion in this case is a combustion reaction with water vapor. In addition, it is useful to apply the present invention to such a combustion reaction with water vapor.

The present invention can be used for fuel cells, gasoline automobiles, diesel automobiles, thermal power plants, production of chemical products, exhaust gas treatments, and the like.

Fuel cells: Ammonia is decomposed into hydrogen using the supported catalyst of the present invention and electric power is taken out by utilizing the obtained hydrogen as a fuel.

Gasoline automobiles: Ammonia is burned using the supported catalyst of the present invention and heat generated during ammonia combustion is utilized for a combustor.

Diesel automobiles: The catalyst of the present invention can be used as a NOx purification catalyst (NH3-SCR) in diesel automobiles.

Thermal power: Ammonia is burned using the supported catalyst of the present invention and turbines (mainly stream turbines) are driven by heat generated during ammonia combustion. Further, the supported catalyst of the present invention can be applied to pre-heating, pre-mixing, or heating of gas turbines.

Production of chemical products: Ammonia is burned using the supported catalyst of the present invention and the heat generated during the ammonia combustion is utilized for production of chemical products (production of ethylene, petroleum refining, production of hydrogen from natural gas, heavy oil desulfurization, and the like) which are produced in a temperature range of room temperature to 900° C.

Exhaust gas treatments: The catalyst of the present invention can be used as a detoxification catalyst of a trace amount of NH3.

REFERENCE SIGNS LIST

100: hydrogen production device
110: reactor
120: ammonia combustion unit
125: supported catalyst
130: support portion
140: flow path
200: hydrogen production device
210: reactor
220: ammonia combustion unit
225: supported catalyst
230: support portion
240: flow path

The invention claimed is:

1. A supported catalyst comprising:
a support body which is formed by a catalyst composition being supported by a carrier,
wherein the catalyst composition consists of an oxide of copper or a combination of an oxide of copper with at least one metal selected from the group consisting of silver, gold, iridium, platinum, palladium, rhodium, and ruthenium,
the carrier consists of $10Al_2O_3 \cdot 2B_2O_3$, and
the amount of the catalyst composition based on 100% by mass of the carrier is 4% by mass or more.

2. An ammonia combustion method comprising:
reacting ammonia with oxygen in the presence of the supported catalyst according to claim 1.

3. A hydrogen production method for producing hydrogen from ammonia, comprising:
an ammonia combustion step of reacting ammonia with oxygen in the presence of the supported catalyst according to claim 1; and
an ammonia decomposition step of decomposing the ammonia into hydrogen and nitrogen by utilizing heat generated by the reaction between the ammonia and the oxygen.

* * * * *